H. H. Smith,
Mower.
No. 2403. Reissued Nov. 27. 1866.
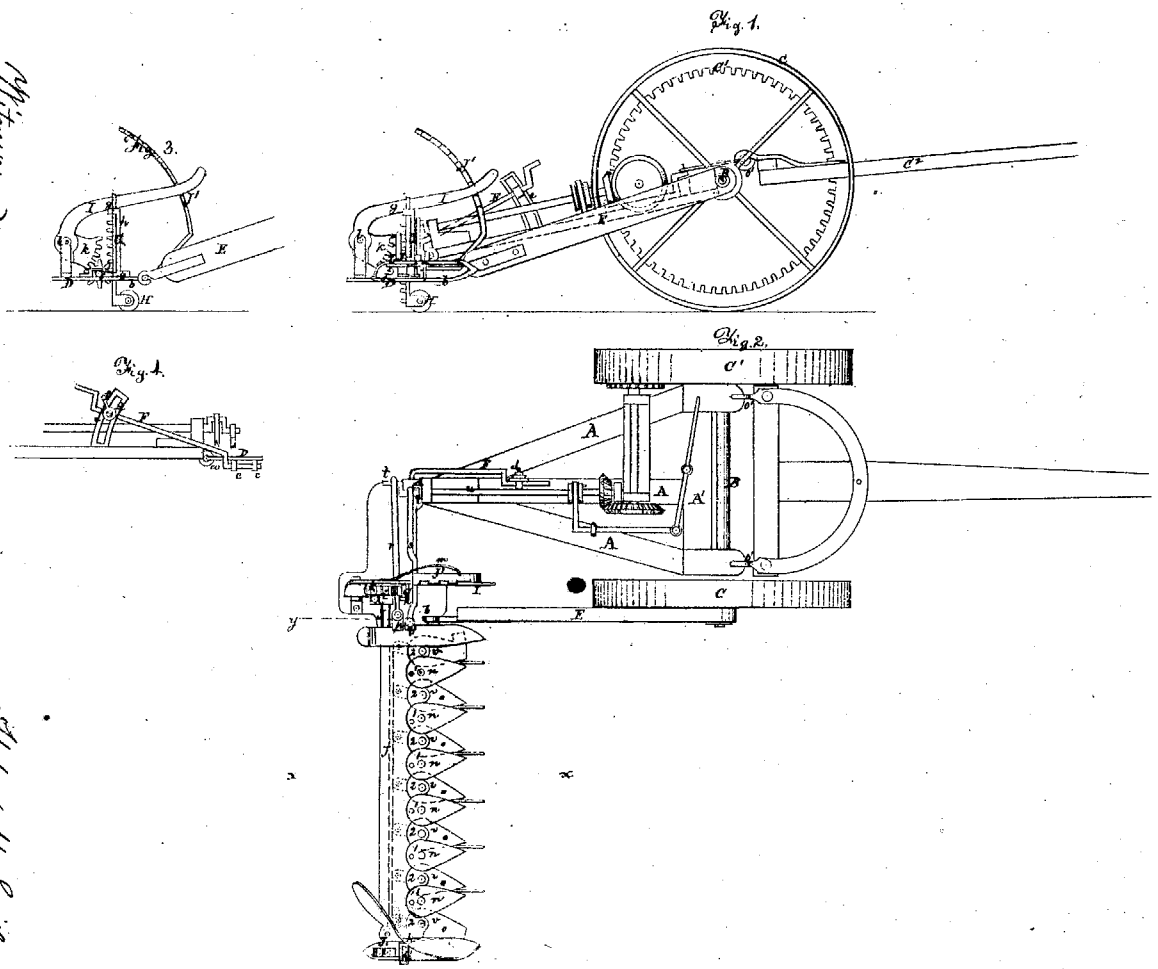
Witnesses
R. Leech
N. B. Smith
Hobart H. Smith
by his Attorney
A. M. Smith

United States Patent Office.

IMPROVEMENT IN HARVESTERS.

HOBART H. SMITH, OF CARLISLE, PENNSYLVANIA, ASSIGNEE BY MESNE ASSIGNMENTS OF C. M. LUFKIN.

DIV. E.

*Letters Patent No.* 18,173, *dated September* 8, 1857; *reissue No.* 2,403, *dated November* 27, 1866.

SPECIFICATION.

TO ALL WHOM IT MAY CONCERN:

Be it known that C. M. LUFKIN, of Acworth, in the county of Sullivan, and State of New Hampshire, invented certain new and useful improvements in Harvesting Machines; and I do hereby declare the following to be a full, clear, and exact description of that part thereof which is embraced in this application, reference being had to the accompanying drawing, making part of the same, in which—

Figure 1 is a transverse section of a harvesting machine, embracing said improvements taken in line *x x*, fig. 2.

Figure 2 is a plan or top view of the same.

Figure 3 is a transverse section of the finger-bar, taken in line *y y*, and showing the means employed for raising and lowering the cutting apparatus; and Figure 4 is a detached view showing the means for elevating and depressing the points of the cutters.

Similar letters of reference denote corresponding parts in the several figures.

The object of the improvement embraced in this application is to provide means for causing a laterally projecting hinged cutting apparatus, whose vertical movements or vibrations at each end are independent of those of the main axle of the machine, to ride lightly and easily over the ground, and for readily adjusting the height of the same bodily to adapt it to the work to be performed, whether reaping or mowing; and to this end, said improvement consists in combining in a two-wheel side-draught machine, a carrying-wheel or roller, with the heel or inner end of a laterally projecting hinged cutting apparatus, which is free at said end, independently of the other end and of the vertical movements or vibrations of the main axle of the machine, to follow the undulations in the surface of the ground over which it is drawn.

It further consists in the employment, in a two-wheel side-draught machine, of an adjustable wheel or wheels connected to and in combination with a laterally projecting hinged cutting apparatus which is free, at each end independently of the other, and of the vertical movements or vibrations of the main axle, to follow the undulations in the surface of the ground over which it is drawn, for the purpose of adjusting the height of said cutting apparatus from the ground, and in such manner as to be equally applicable in both reaping and mowing.

It further consists in the use of a rock-shaft, lever, and an adjusting wheel or wheels, in combination with such laterally projecting hinged cutting apparatus; and it further consists in combining with said laterally projecting hinged cutting apparatus, which, as above stated, is free at each end, independently of the other, and of the vertical movements or vibrations of the main axle, to conform to the surface of the ground; a mechanism whereby the attendant by operating a single lever is enabled to raise and lower the cutting apparatus bodily, for the purpose stated.

To enable others to construct and use said improvement, I will proceed, with reference to the drawing, to describe how the same may be carried out in practice.

A represents a main frame connected at one end to and freely vibrating about the main axle, B, as a centre; C $C^1$ are two independent carrying-wheels mounted on the opposite ends of said axle; $C^2$ is the tongue by which the machine is drawn; D is the finger-bar of the cutting apparatus, which is connected by a hinge at one end, to and projects laterally from the vibrating or drooping end of the frame, as shown by the drawing, and in such manner as will allow the outer end to rise and fall, turning on its hinge-connection with the frame as a centre, to conform to the surface of the ground over which it is drawn, whilst the connection of the heel or hinged end of the cutting apparatus to the freely vibrating end of frame A, allows said end also to freely follow the undulations in the surface of the ground, independently of the outer end, and independently of the vertical movements or vibrations of the main axle. G G are two vertical racks, fitted in guides, *g*, attached to uprights, *h*, on the finger-bar. In the lower end of each rack a wheel, H, is placed, said wheels resting on the ground and supporting the weight of the cutting apparatus. With each rack a pinion, *i*, gears, said pinions being attached to a rock-shaft, *j*, fitted in bearings on the bar, D. The pinion on the inner end of said shaft is also made to gear with a cogged sector, *k*, on the lower short arm of bent lever I, which has its fulcrum at *l*. The upper end of said lever traverses a curved rack or standard, J′, and is retained in said rack at any desired point by spring, *m*, attached to said lever, I. By raising or lowering the upper or long arm of lever I, the toothed segment on the lower end causes the pinion, *i*, fastened to the inner end of the rock-shaft, *j*, to rock or roll, turning the shaft with it, thereby operating racks G, and wheels H, and the finger-bar and cutters are adjusted up or down bodily, and may be set at any desired height from the ground in the manner explained, without in any way interfering with the freedom of the cutting apparatus to conform to and to maintain at each end a uniform distance from the surface of the ground. The sickle is formed of two sets of cutters, *n o*, which are pivoted to bar D in the manner shown at 1 and 2, fig. 2; the cutters working on the pivots which serve as fulcra. The rear ends of the cutters are attached to bars, *p q*, which bars are connected by rods, *r s*, to reverse cranks, *t t*, on the driving shaft, *u*, which receives motion by suitable gearing from the driving-wheel, C. The rear or inner ends of cutters, *n*, are curved, and are let into a plate, J, secured to bar D. The cutters *o* are below the cutters *n*, and the two sets operate together, working one over the other, similar to the blades of shears. The plate, J, is fitted to the ends of cutters *n*, as shown in the drawing, and being set flush with the face of said cutters does not obstruct the passage of the cut grass or grain over the same.

What is claimed under this patent, as the invention of C. M. Lufkin, is—

1. The employment, in a two-wheel side-draught machine, of acarrying-wheel or roller connected to the inner or heel end of a laterally projecting hinged cutting apparatus, which is free at said end to conform to the surface of the ground over which it is drawn, independently of the vertical movements or vibrations of the main axle of said machine, for the purpose specified.

2. The employment, in a two-wheel side-draught machine, of an adjustable wheel or wheels, connected to and in combination with a laterally projecting hinged cutting apparatus, which is free at each end, independently of the other end and of the vertical vibrations of the main axle, to conform to the inequalities in the surface of the ground over which it is drawn, in such manner that the same may be used both in reaping and mowing, for the purpose specified.

3. The employment of a rock-shaft, lever, and an adjusting wheel or wheels, in combination with a hinged cutting apparatus, which projects laterally from the main frame by which it is drawn forward over the ground.

4. A laterally projecting hinged cutting apparatus, which is free at each end, independently of the other, to conform to inequalities in the surface of the ground over which it is drawn, in combination with a mechanism whereby the attendant is enabled, by operating a single lever, to raise and lower said cutting apparatus bodily, for the purpose specified.

In testimony whereof I have hereunto set my hand, this 22d day of October, 1866.

HOBART H. SMITH.

Witnesses:

J. F. Goucher,

S. D. Houston.